UNITED STATES PATENT OFFICE.

ANDREW K. SHRIVER, OF BALTIMORE, MARYLAND.

IMPROVEMENT IN PROCESSES FOR TREATING SEALED CANS OF OYSTERS, FRUITS, &c.

Specification forming part of Letters Patent No. 152,181, dated June 16, 1874; application filed April 27, 1874.

*To all whom it may concern:*

Be it known that I, ANDREW K. SHRIVER, of Baltimore city, State of Maryland, have invented a new and Improved Method of Processing Hermetically-Sealed Cans of Fruit, Fish, Vegetables, &c.; and I do hereby declare that the following is a full, clear, and exact description of the same.

The invention relates to methods of processing fresh fruits, vegetables, oysters, or other analogous articles in order to preserve their peculiar flavors.

It will first be clearly described in connection with all that is necessary to a full understanding thereof, and then pointed out in the claim.

In my patent granted March 31, 1874, I describe a process of applying the requisite amount of heat to the filled cans by confining them in a tight chamber, and surrounding them with steam at any desired maximum of temperature, whereby the time of exposure to the heat and consequent injury by burning to can and fruit are greatly lessened, while all danger of bursting or explosion is prevented by the attainment of nearly if not quite an equilibrium of pressure on the inside and outside of the can. In practical experiments, however, made since that application was filed, I find that the contact of steam with the can still produces, to some extent, a scorching of the fruit that lies next to the inner face of can, and that the fruit or oysters have a slightly burnt taste in consequence, the can itself also exhibiting a bluish color on the inside. By repeated experiments I discovered that, if the boiler, steamer, or processing vessel in which the cans are placed is sufficiently filled with water to surround the can with that element, and the superheated steam is then admitted, preferably below the surface of the water, the pressure upon the intermediate water will be transmitted to the outside of can and perfectly counterbalance the pressure from the inside of can until the cooking or processing has been completed. While this effect, so necessary in the operation, is secured the concomitant one is obtained of causing all the fruit or oysters on the inside to be uniformly acted upon by the heat, and neither can, oysters, or fruit be at all scorched or injured. I find that, by simply noticing the steam-gage, and by the regulation of the safety-valve and thermometer, I can bring to bear with the superheated steam and confined to any desired degree of temperature from 210° to 350° for the different kinds of articles.

By this process I not only am enabled to discard the use of chloride of calcium and salt, as now used in the open kettles, with their dangerous effects to the person, corroding effects upon the tin, and darkened appearance, as well as scorched taste imparted to the fruits, vegetables, and oysters, but I can also apply a higher heat, do the work in a shorter time, and perform the whole operation at a greatly-reduced expense.

Having thus described my invention, what I claim is—

The process of hermetically sealing fruit, vegetables, meats, or oysters in cans by confining them in a tight vessel, immersing them in water or other liquid, and then applying steam, more or less heated, according to the article processed, in the manner set forth.

ANDREW K. SHRIVER.

Witnesses:
 ADELBERT NICKEL,
 THO. J. MYER.